United States Patent
Kumagai et al.

(10) Patent No.: US 8,500,444 B2
(45) Date of Patent: Aug. 6, 2013

(54) ROTARY KILN AND BATTERY MATERIAL MANUFACTURED BY THE ROTARY KILN

(75) Inventors: Hiroki Kumagai, Toki (JP); Fumihiko Kato, Toki (JP); Sadahiko Kawasaki, Toki (JP)

(73) Assignee: Takasago Industry Co., Ltd., Toki (JP)

( * ) Notice: Subject to any disclaimer, the term of this patent is extended or adjusted under 35 U.S.C. 154(b) by 311 days.

(21) Appl. No.: 12/842,582

(22) Filed: Jul. 23, 2010

(65) Prior Publication Data

US 2011/0065005 A1     Mar. 17, 2011

(30) Foreign Application Priority Data

Sep. 14, 2009 (JP) ................. 2009-212466

(51) Int. Cl.
F27B 7/36 (2006.01)

(52) U.S. Cl.
USPC .......................... 432/103; 432/113

(58) Field of Classification Search
USPC ................ 432/103–118
See application file for complete search history.

(56) References Cited

U.S. PATENT DOCUMENTS

| | | | | |
|---|---|---|---|---|
| 4,032,121 A * | 6/1977 | Stift et al. | ...... | 266/163 |
| 4,439,275 A * | 3/1984 | Noguchi | ...... | 202/100 |
| 5,096,415 A * | 3/1992 | Coucher | ...... | 432/14 |
| 5,874,058 A * | 2/1999 | Sheargold et al. | ...... | 423/599 |
| 7,811,083 B2 * | 10/2010 | Bohringer et al. | ...... | 432/118 |
| 7,939,028 B2 * | 5/2011 | Ohashi et al. | ...... | 422/198 |
| 2011/0041652 A1 * | 2/2011 | Ishiwata et al. | ...... | 75/468 |
| 2011/0189078 A1 * | 8/2011 | Ohashi et al. | ...... | 423/460 |

FOREIGN PATENT DOCUMENTS

JP     2003-119027     4/2003
JP     2003-267729     9/2003

OTHER PUBLICATIONS

U.S. Appl. No. 12/842,594, filed Jul. 23, 2010, Kumagai, et al.

* cited by examiner

*Primary Examiner* — Gregory A Wilson
(74) *Attorney, Agent, or Firm* — Oblon, Spivak, McClelland, Maier & Neustadt, L.L.P.

(57) ABSTRACT

A rotary kiln includes a cylindrical shell that rotates about its own axis and that has a heat treatment chamber provided radially inward of the shell. In the rotary kiln, a heat treatment is performed on a process material in the heat treatment chamber to manufacture a battery material. The shell is made of a carbon material. Since the shell is made of a carbon material, the rotary kiln can suppress contamination of metal scale, which adversely affects the battery material, into the battery material.

4 Claims, 13 Drawing Sheets

ROTARY KILN AND BATTERY MATERIAL MANUFACTURED BY THE ROTARY KILN

INCORPORATION BY REFERENCE

The disclosure of Japanese Patent Application No. 2009-212466 filed on Sep. 14, 2009 including the specification, drawings and abstract is incorporated herein by reference in its entirety.

BACKGROUND OF THE INVENTION

1. Field of the Invention

The present invention relates to a rotary kiln used to manufacture a battery material, and to a battery material manufactured by the rotary kiln.

2. Description of the Related Art

Secondary batteries are widely used as power sources for mobile devices such as cellular phones and laptop computers. The secondary batteries are also widely used as power sources for driving motors of hybrid vehicles, which have become increasingly popular in recent years from the viewpoint of environmental protection.

In the related art, a battery material for use as a cathode active material of the secondary batteries or the like is manufactured by a periodic kiln. In recent years, however, the need for the secondary batteries has been significantly increased as discussed above. Thus, a continuous kiln which has an excellent processing capacity compared to the periodic kiln is drawing attention. In general, SUS (Stainless Used Steel) with excellent heat resistance and excellent oxidation resistance is used as the material of a portion of the continuous kiln that contacts the battery material.

In the case where SUS is used as the material of the portion of the continuous kiln that contacts the battery material, however, metal scale such as Cr (chromium), Fe (iron), and Ni (nickel) in SUS may contaminate the battery material. This causes degradation in performance of the battery material.

Thus, each of Japanese Patent Application Publication No. 2003-119027 (JP-A-2003-119027) and Japanese Patent Application Publication No. 2003-267729 (JP-A-2003-267729) describes a manufacturing method for a battery material that can suppress contamination of a metal component. In the manufacturing method according to JP-A-2003-119027, a battery material is first manufactured by a rotary kiln, then the manufactured battery material is pulverized, and after that a magnetic force is applied to the pulverized battery material. That is, Fe scale and SUS scale are removed from the battery material by applying a magnetic force to the battery material. In the manufacturing method according to JP-A-2003-267729, an Al (aluminum) plating process is performed on the inner peripheral surface of a shell, which is made of SUS, of a rotary kiln. A coating is formed by the plating process on the inner peripheral surface of the shell. The coating suppresses contamination of Cr, Fe, and Ni from the shell made of SUS into the battery material.

However, the manufacturing method according to JP-A-2003-119027 requires a process for applying a magnetic force to the battery material. This reduces the production capacity. The manufacturing method also requires equipment that applies a magnetic force to the battery material. This increases the equipment cost.

In the manufacturing method according to JP-A-2003-267729, the coating formed on the inner peripheral surface of the shell may be exfoliated to expose the bare surface of the shell made of SUS. In this case, Cr, Fe, and Ni of the shell contaminate the battery material.

SUMMARY OF THE INVENTION

The rotary kiln and the battery material manufactured by the rotary kiln according to the present invention have been completed in view of the aforementioned issues. It is an object of the present invention to provide a rotary kiln that can suppress contamination of metal scale into a battery material, and a battery material manufactured by the rotary kiln.

(1) In order to address the aforementioned issues, a first aspect of the present invention provides a rotary kiln including a cylindrical shell that rotates about an axis thereof and has a heat treatment chamber provided radially inward of the shell. In the rotary kiln, a heat treatment is performed on a process material in the heat treatment chamber to manufacture a battery material. The shell is made of a carbon material. The "battery material" includes not only an end product but also a precursor of the end product and an intermediate product.

The rotary kiln according to the present invention is used to manufacture a battery material. The shell is made of a carbon material. Therefore, contamination of metal scale, which adversely affects the battery material, into the battery material can be suppressed. Thus, degradation in performance of the battery material can be suppressed.

From the viewpoint of avoiding contamination of metal scale, it is conceivable to provide a shell made of a ceramic. The shell of the rotary kiln according to the present invention provides excellent processability and excellent heat shock resistance compared to the shell made of a ceramic.

(2) According to a second aspect of the present invention, in the aforementioned configuration (1), it is preferable that the rotary kiln further includes a gas supply section that supplies a non-oxidizing gas to a space radially inward of the shell and a space radially outward of the shell.

The heat treatment chamber in which a heat treatment is performed on the process material is disposed in a space radially inward of the shell. Therefore, a heat treatment involves a rise in temperature of the shell. A rise in temperature of the shell may cause oxidation of the shell made of a carbon material.

In this respect, according to this configuration, the gas supply section is provided. The gas supply section supplies a non-oxidizing gas to a space radially inward of the shell and a space radially outward of the shell. Therefore, oxidation of the inner peripheral surface and the outer peripheral surface of the shell can be suppressed.

(3) According to a third aspect of the present invention, in the aforementioned configuration (1) or (2), it is preferable that the rotary kiln further includes a discharge section that discharges the battery material from the shell, and a material contact portion of the discharge section that contacts the battery material is made of a carbon material. According to this configuration, at least the material contact portion of the discharge section is made of a carbon material. Therefore, contamination of metal scale into the carbon material after the heat treatment can be suppressed.

According to the present invention, it is possible to provide a rotary kiln that can suppress contamination of metal scale into a battery material, and a battery material manufactured by the rotary kiln.

DETAILED DESCRIPTION OF THE EMBODIMENTS

A rotary kiln and a battery material manufactured by the rotary kiln according to an embodiment of the present invention will be described below.

<Configuration of Rotary Kiln>

Figure 1:
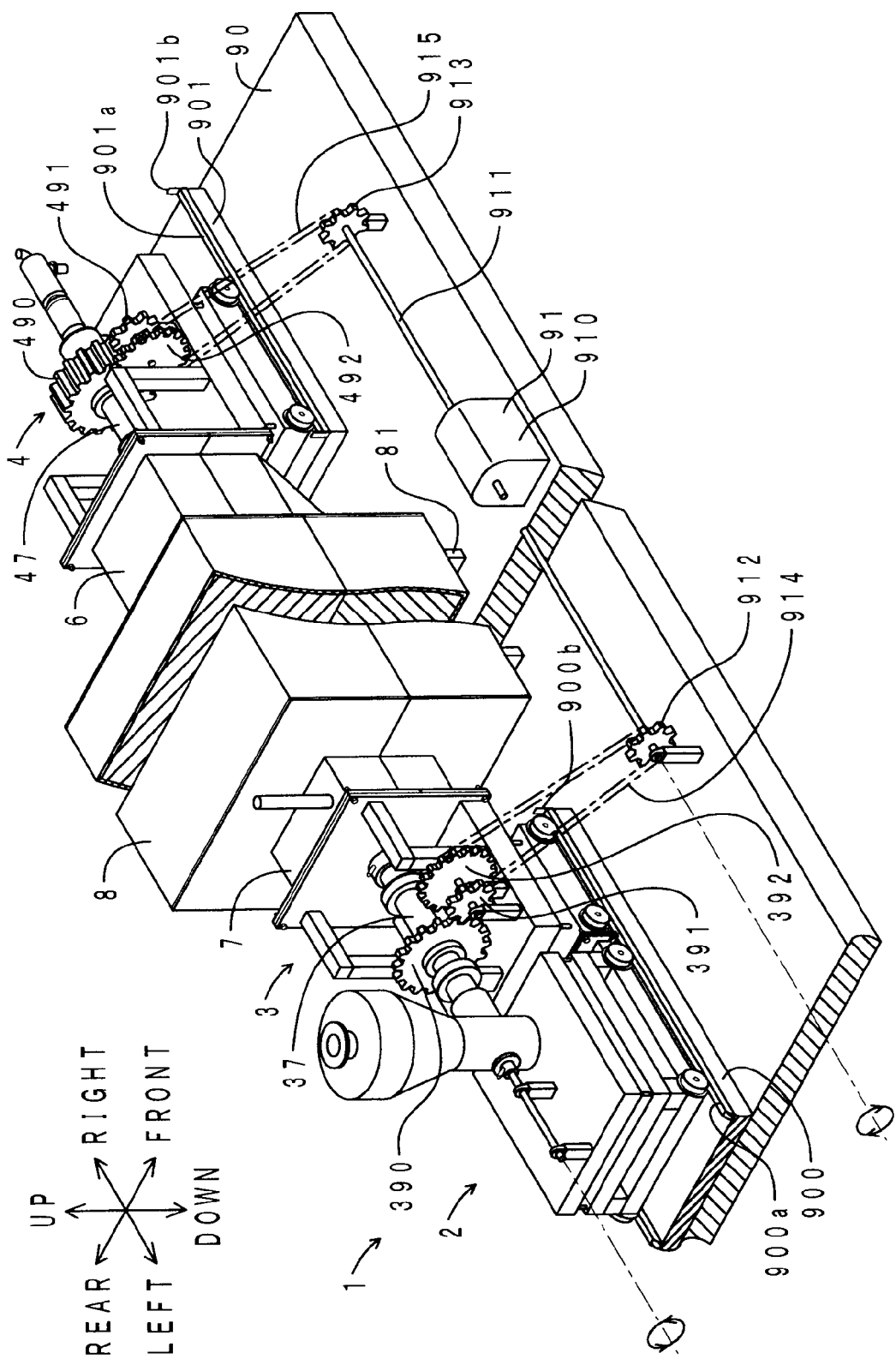
FIG. 1 is a perspective view of a rotary kiln according to an embodiment of the present invention.
Figure 2:
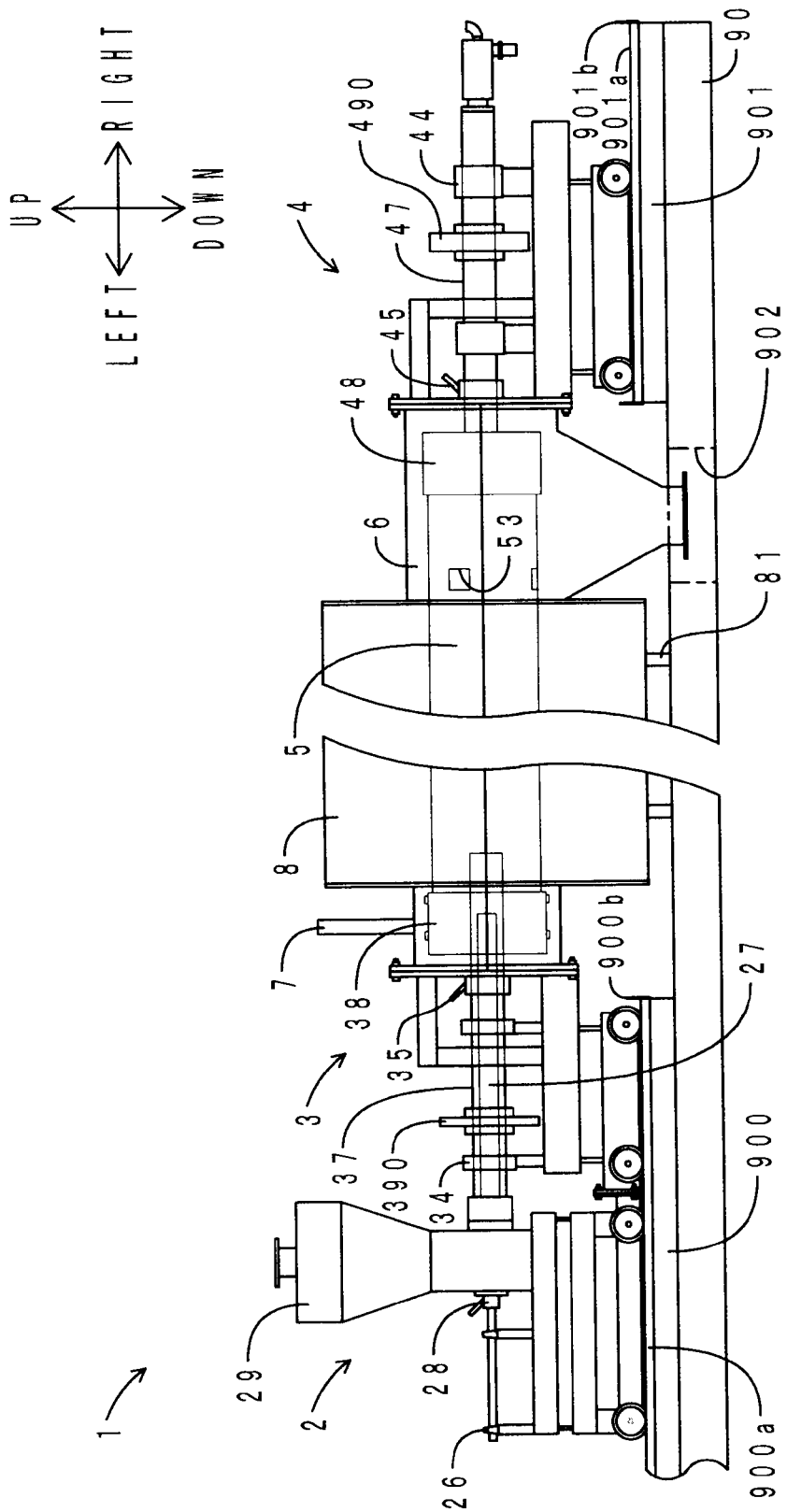
FIG. 2 is a transparent front view of the rotary kiln.

First, the configuration of the rotary kiln according to the embodiment is described. In the drawings, the left side corresponds to the supply side (upstream side), and the right side corresponds to the discharge side (downstream side). For convenience of description, three fins 56 of a shell 5 are not shown in drawings other than FIG. 10. FIG. 1 is a perspective view of the rotary kiln according to the embodiment. FIG. 2 is a transparent front view of the rotary kiln.

As shown in FIGS. 1 and 2, a rotary kiln 1 according to the embodiment includes a supply part cart 2, a supply-side support cart 3, a discharge-side support cart 4, the shell 5, a discharge chute 6, a supply-side coupling tubular portion 7, a heating section 8, a platform 90, and a drive section 91. The discharge chute 6 is included in the discharge section according to the present invention.

[Platform 90]

The platform 90 has the shape of a plate. The platform 90 is placed on a site of a plant. The platform 90 includes a supply-side track portion 900, a discharge-side track portion 901, and a product extraction hole 902. As shown in FIG. 2, the product extraction hole 902 is drilled in the platform 90. The supply-side track portion 900 includes a pair of rails 900a. The rails 900a are made of steel, and extend in the left-right direction. Stoppers 900b are respectively disposed at both ends of the rails 900a in the left-right direction. The discharge-side track portion 901 includes a pair of rails 901a. The rails 901a are made of steel, and extend in the left-right direction. Stoppers 901b are respectively disposed at both ends of the rails 901a in the left-right direction.

[Drive Section 91]

As shown in FIG. 1, the drive section 91 includes a motor 910, a shaft 911, a supply-side drive sprocket 912, and a discharge-side drive sprocket 913. The motor 910 is disposed on the upper surface of the platform 90. The shaft 911 is coupled to a rotary shaft of the motor 910. The supply-side drive sprocket 912 is fixed at the left end of the shaft 911. The discharge-side drive sprocket 913 is fixed at the right end of the shaft 911.

[Supply Part Cart 2]

Figure 3:
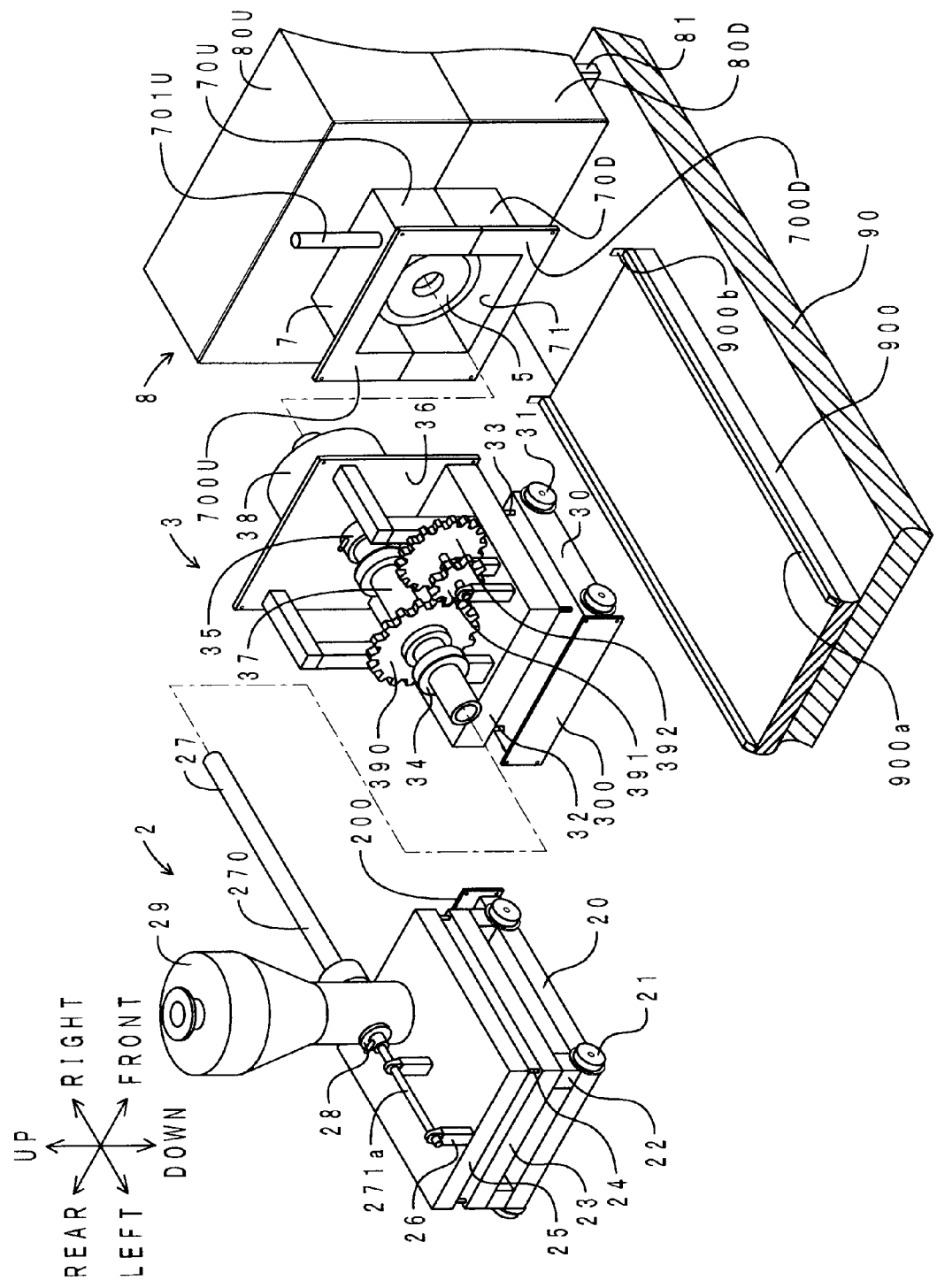
FIG. 3 is an exploded perspective view of a left portion of the rotary kiln.
Figure 4:
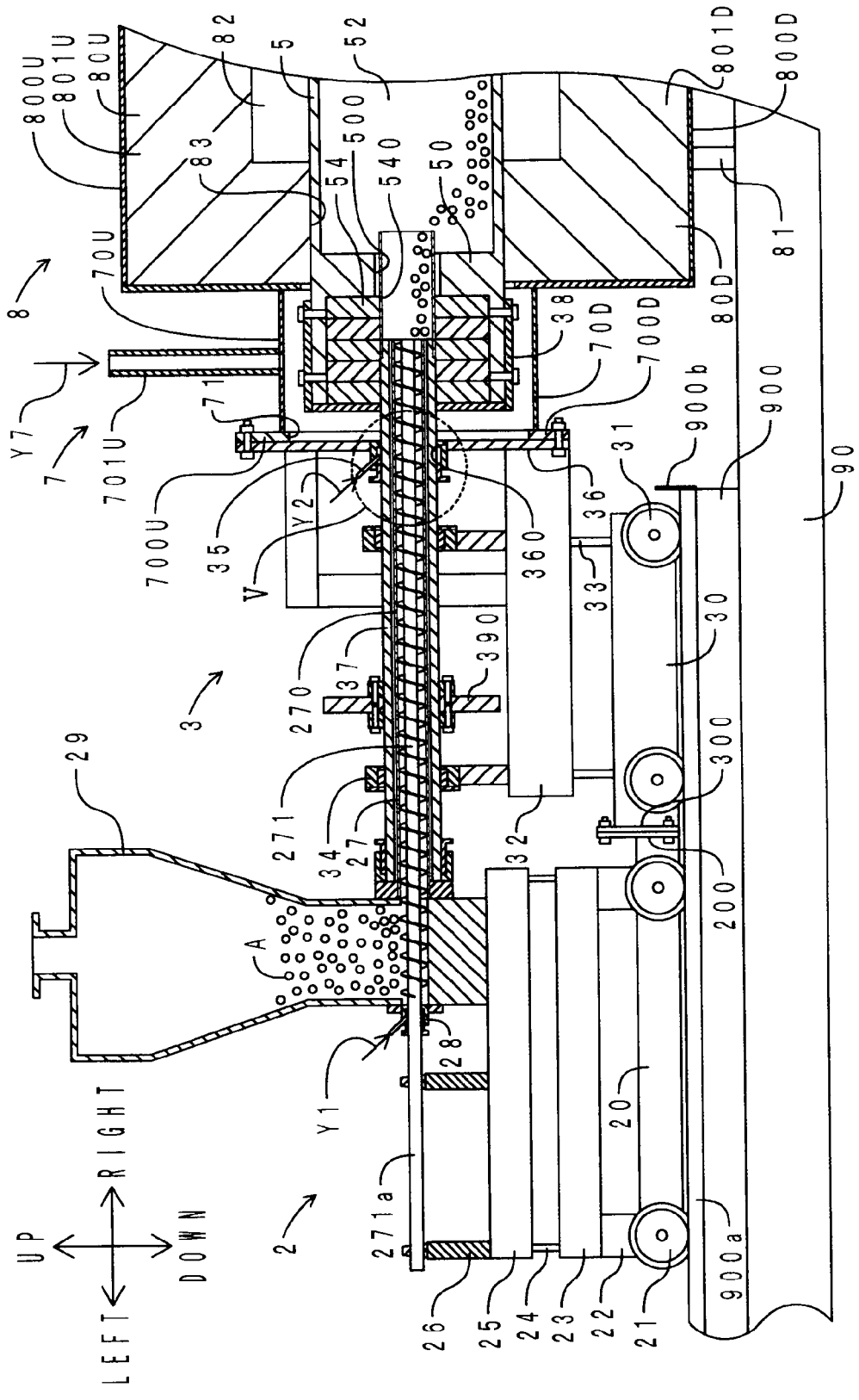
FIG. 4 is a cross-sectional view of the left portion taken in the left-right direction.

FIG. 3 is an exploded perspective view of a left portion of the rotary kiln according to the embodiment. FIG. 4 is a cross-sectional view of the left portion taken in the left-right direction. As shown in FIGS. 3 and 4, the supply part cart 2 includes a lower stage portion 20, four wheels 21, four coupling pillars 22, a middle stage portion 23, four coupling rods 24, an upper stage portion 25, a pair of bearing portions 26, a screw feeder 27, a sealing portion 28, and a supply hopper 29. The sealing portion 28 is included in the gas supply section according to the present invention.

The lower stage portion 20 is made of steel, and has the shape of a rectangular plate. A coupling plate 200 is disposed at the right end of the lower stage portion 20. The four wheels 21 are disposed in the vicinity of the four corners of the lower stage portion 20. The four wheels 21 can roll in the left-right direction on the pair of rails 900a. That is, the supply part cart 2 is movable in the left-right direction along the pair of rails 900a.

The middle stage portion 23 is made of steel, and has the shape of a rectangular plate. The middle stage portion 23 is disposed above the lower stage portion 20. Each of the four coupling pillars 22 has the shape of a rectangular column. The four coupling pillars 22 are interposed between the lower stage portion 20 and the middle stage portion 23.

The upper stage portion 25 is made of steel, and has the shape of a rectangular plate. The upper stage portion 25 is disposed above the middle stage portion 23. Each of the four coupling rods 24 has the shape of a round bar. The four coupling rods 24 are interposed between the middle stage portion 23 and the upper stage portion 25.

The pair of bearing portions 26 is disposed on the upper surface of the upper stage portion 25. The pair of bearing portions 26 is arranged in the left-right direction at a predetermined interval between each other. The supply hopper 29 is made of steel, and has the shape of a cone tapered downward. The supply hopper 29 is disposed on the upper surface of the upper stage portion 25. The supply hopper 29 is disposed on the right side of the pair of bearing portions 26. A process material A is stored in the supply hopper 29.

The screw feeder 27 includes a screw-housing cylindrical portion 270 and a screw 271. The screw-housing cylindrical portion 270 is made of steel, and has the shape of a cylinder. The screw-housing cylindrical portion 270 is projected rightward from the lower end of the supply hopper 29. The screw 271 is housed in the screw-housing cylindrical portion 270. The screw 271 is driven by a drive force of a motor (not shown) to rotate about its own axis. A shaft portion 271a of the screw 271 penetrates through the left wall of the supply hopper 29. The penetrating end of the shaft portion 271a is supported by the pair of bearing portions 26 so as to be rotatable about its own axis.

The sealing portion 28 is interposed between the left wall of the supply hopper 29 and the shaft portion 271a of the screw 271. The sealing portion 28 seals a gap between the left wall of the supply hopper 29 and the shaft portion 271a while permitting turning of the shaft portion 271a. The configuration of the sealing portion 28 is the same as the configuration of a sealing portion 35 of the supply-side support cart 3 to be discussed later (see FIG. 5). A nitrogen gas is supplied from the sealing portion 28 as indicated by an arrow Y1. The nitrogen gas is included in the non-oxidizing gas according to the present invention. The nitrogen gas is diffused inside the supply hopper 29 and inside the screw-housing cylindrical portion 270.

[Supply-Side Support Cart 3]

The supply-side support cart 3 includes a lower stage portion 30, four wheels 31, an upper stage portion 32, four coupling rods 33, a pair of bearing portions 34, the sealing portion 35, a coupling plate 36, a supply-side rotary shaft 37, a supply-side holder 38, a supply-side gear 390, a supply-side pinion 391, and a supply-side sprocket 392. The sealing portion 35 is included in the gas supply section according to the present invention.

The lower stage portion 30 is made of steel, and has the shape of a rectangular plate. A coupling plate 300 is disposed at the left end of the lower stage portion 30. The coupling plate 300 can be coupled to the coupling plate 200 via a bolt-nut mechanism. That is, the supply-side support cart 3 and the supply part cart 2 can be coupled to each other. The four wheels 31 are disposed in the vicinity of the four corners of the lower stage portion 30. The four wheels 31 can roll in the left-right direction on the pair of rails 900a. That is, the supply-side support cart 3 is movable in the left-right direction along the pair of rails 900a.

The upper stage portion 32 is made of steel, and has the shape of a rectangular plate. The upper stage portion 32 is disposed above the lower stage portion 30. Each of the four coupling rods 33 has the shape of a round bar. The four coupling rods 33 are interposed between the lower stage portion 30 and the upper stage portion 32.

The pair of bearing portions 34 is disposed on the upper surface of the upper stage portion 32. The pair of bearing portions 34 is arranged in the left-right direction at a predetermined interval between each other. The coupling plate 36 is made of steel, and has the shape of a rectangular plate. The coupling plate 36 is disposed at the right end of the upper stage portion 32. A supply-side rotary shaft insertion hole 360 is drilled in the coupling plate 36. The supply-side rotary shaft 37 is made of steel, and has the shape of a cylinder. The supply-side rotary shaft 37 is supported by the pair of bearing portions 34 so as to be rotatable about its own axis. The right end of the supply-side rotary shaft 37 is inserted into the supply-side rotary shaft insertion hole 360.

Figure 5:
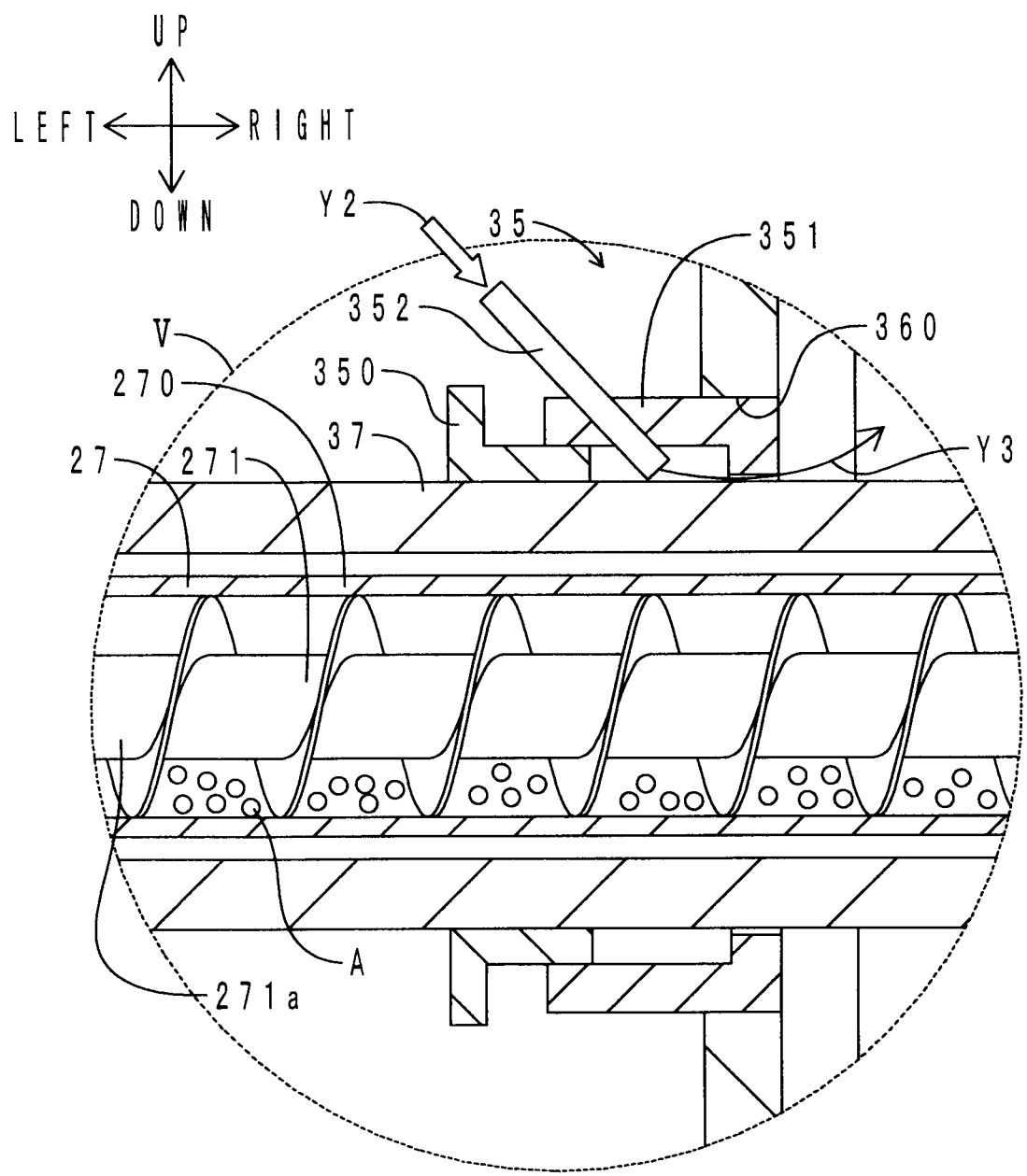
FIG. 5 is an enlarged view of a portion inside a circle V of FIG. 4.

FIG. 5 is an enlarged view of a portion inside a circle V of FIG. 4. As shown in FIG. 5, the sealing portion 35 is interposed between the supply-side rotary shaft 37 and the supply-side rotary shaft insertion hole 360. The sealing portion 35 includes an inner annular portion 350, an outer annular portion 351, and a gas pipe 352. The outer annular portion 351 is made of SUS 304, and has the shape of a bottomed cylinder (cup) opening leftward. The supply-side rotary shaft 37 is inserted through the right bottom wall of the outer annular portion 351. The side peripheral wall of the outer annular portion 351 is fixed to the inner peripheral surface of the supply-side rotary shaft insertion hole 360. The inner annular portion 350 is made of SUS 304, and has the shape of a ring. The inner annular portion 350 seals the left opening of the outer annular portion 351. The inner annular portion 350 is fixed to the outer annular portion 351. The gas pipe 352 penetrates through the side peripheral wall of the outer annular portion 351. A nitrogen gas is supplied from the gas pipe 352 to a space radially inward of the outer annular portion 351 as indicated by an arrow Y2. The nitrogen gas is diffused inside the supply-side coupling tubular portion 7 to be discussed later as indicated by an arrow Y3.

Returning to FIGS. 3 and 4, the supply-side holder 38 is made of steel, and has the shape of a bottomed cylinder (cup) opening rightward. The supply-side holder 38 is disposed on the right side of the coupling plate 36. The supply-side rotary shaft 37 penetrates through the radially inner side of the supply-side holder 38. The supply-side holder 38 is fixed to the outer peripheral surface at the right end of the supply-side rotary shaft 37.

The supply-side gear 390 is made of steel, and has the shape of a circular plate. The supply-side gear 390 is fixed to the outer peripheral surface of the supply-side rotary shaft 37. The supply-side gear 390 is disposed between the pair of bearing portions 34. The supply-side pinion 391 is made of steel, and has the shape of a circular plate. The supply-side pinion 391 is meshed with the supply-side gear 390. The supply-side sprocket 392 is made of steel, and has the shape of a circular plate. The supply-side sprocket 392 and the supply-side pinion 391 are fixed to an identical shaft. As indicated by dash-dotted lines in FIG. 1, a chain 914 is wound between the supply-side sprocket 392 and the supply-side drive sprocket 912.

[Discharge-Side Support Cart 4]

Figure 6:
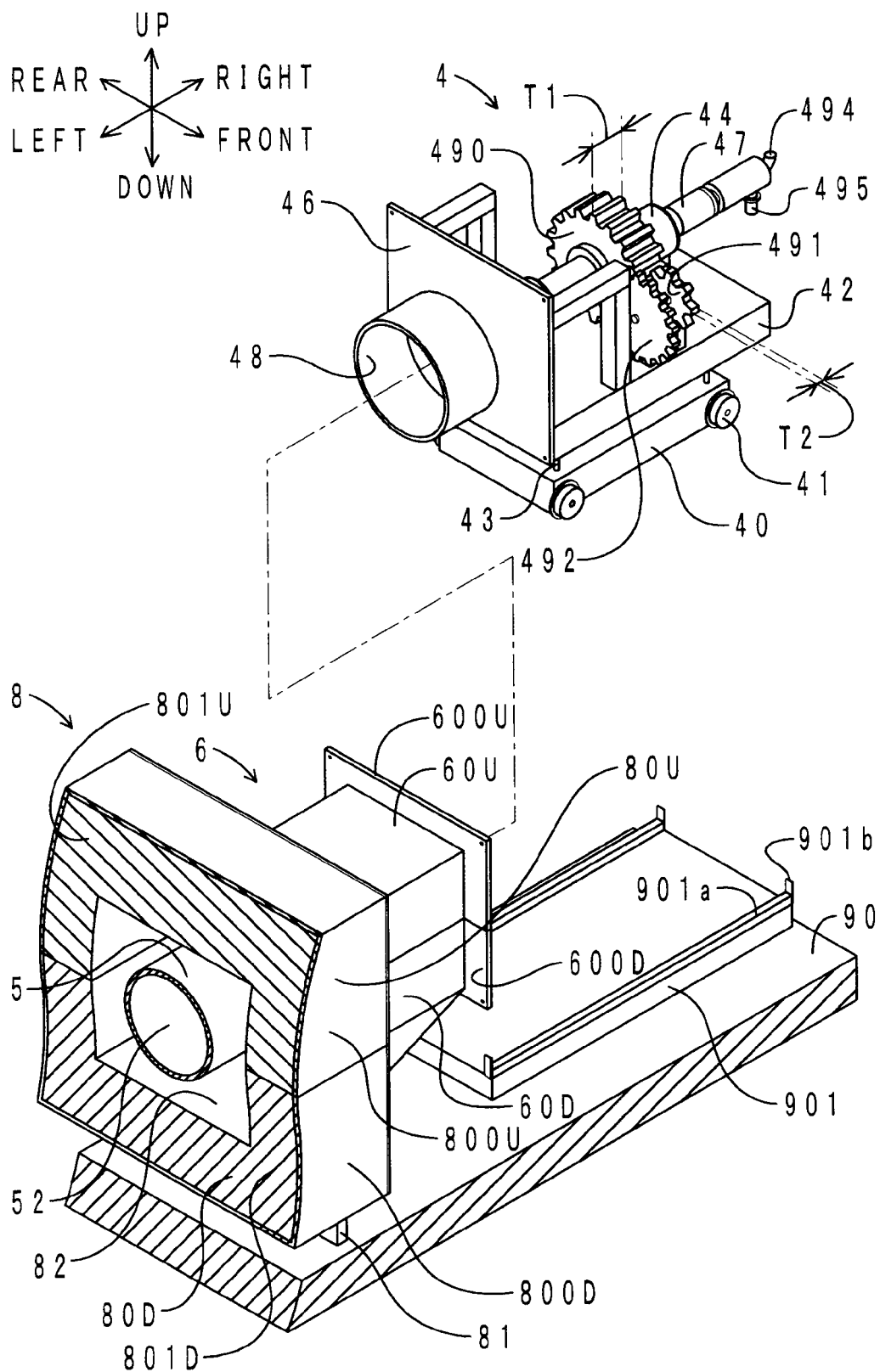
FIG. 6 is an exploded perspective view of a right portion of the rotary kiln.
Figure 7:
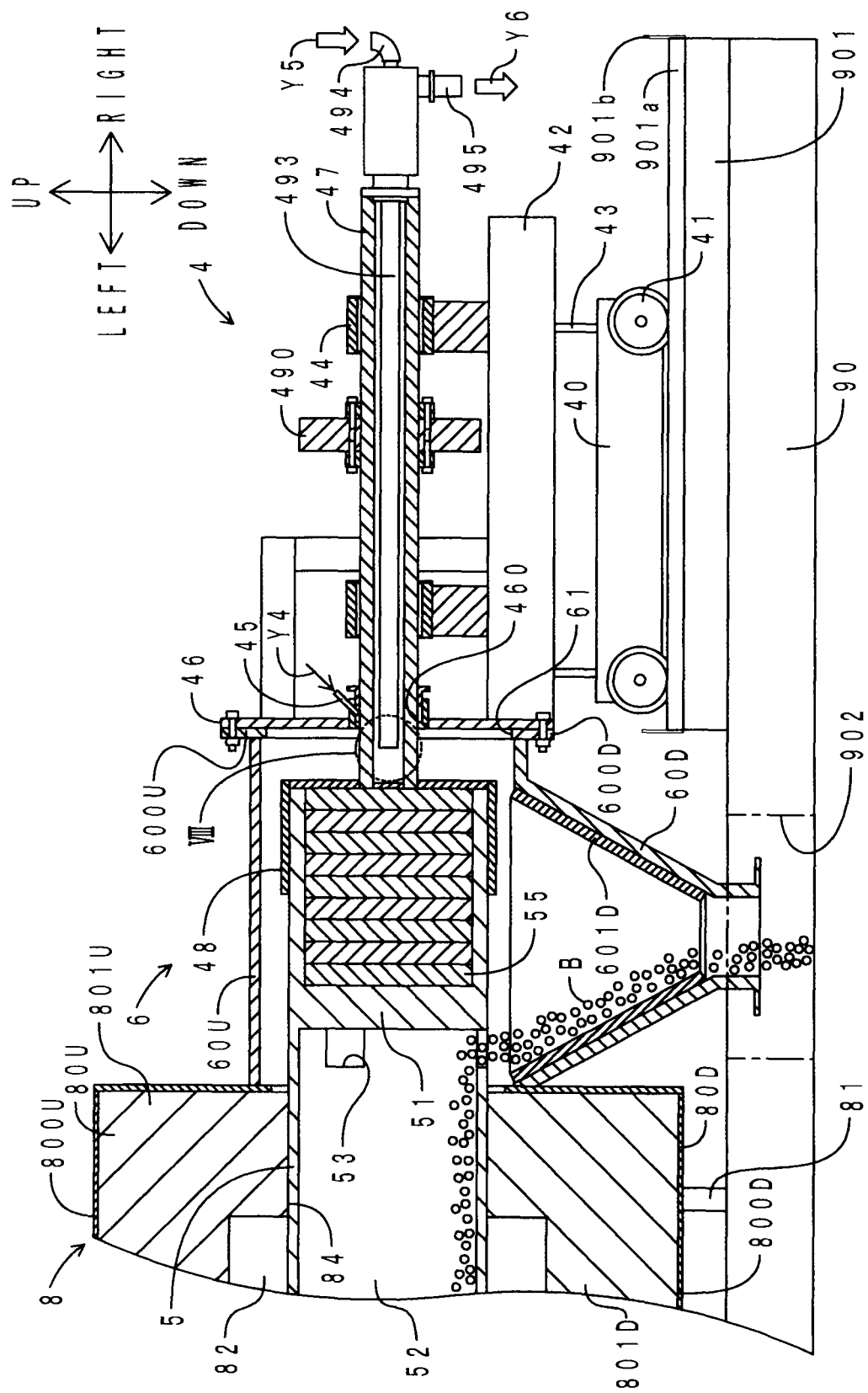
FIG. 7 is a cross-sectional view of the right portion taken in the left-right direction.

FIG. 6 is an exploded perspective view of a right portion of the rotary kiln according to the embodiment. FIG. 7 is a cross-sectional view of the right portion taken in the left-right direction. As shown in FIGS. 6 and 7, the discharge-side support cart 4 includes a lower stage portion 40, four wheels 41, an upper stage portion 42, four coupling rods 43, a pair of bearing portions 44, a sealing portion 45, a coupling plate 46, a discharge-side rotary shaft 47, a discharge-side holder 48, a discharge-side gear 490, a discharge-side pinion 491, a discharge-side sprocket 492, and a cooling pipe 493. The sealing portion 45 is included in the gas supply section according to the present invention.

The lower stage portion 40 is made of steel, and has the shape of a rectangular plate. The four wheels 41 are disposed in the vicinity of the four corners of the lower stage portion 40. The four wheels 41 can roll in the left-right direction on the pair of rails 901a. That is, the discharge-side support cart 4 is movable in the left-right direction along the pair of rails 901a.

The upper stage portion 42 is made of steel, and has the shape of a rectangular plate. The upper stage portion 42 is disposed above the lower stage portion 40. Each of the four coupling rods 43 has the shape of a round bar. The four coupling rods 43 are interposed between the lower stage portion 40 and the upper stage portion 42.

The pair of bearing portions 44 is disposed on the upper surface of the upper stage portion 42. The pair of bearing portions 44 is arranged in the left-right direction at a predetermined interval between each other. The coupling plate 46 is made of steel, and has the shape of a rectangular plate. The coupling plate 46 is disposed at the left end of the upper stage portion 42. A discharge-side rotary shaft insertion hole 460 is drilled in the coupling plate 46. The discharge-side rotary shaft 47 is made of steel, and has the shape of a cylinder. The discharge-side rotary shaft 47 is supported by the pair of bearing portions 44 so as to be rotatable about its own axis. The left end of the discharge-side rotary shaft 47 is inserted into the discharge-side rotary shaft insertion hole 460.

The sealing portion 45 is interposed between the discharge-side rotary shaft 47 and the discharge-side rotary shaft insertion hole 460. The configuration of the sealing portion 45 is the same as the configuration of the sealing portion 35 of the supply-side support cart 3 discussed earlier (see FIG. 5). A nitrogen gas is supplied from the sealing portion 45 as indicated by an arrow Y4. The nitrogen gas is diffused inside the discharge chute 6 to be discussed later.

The discharge-side holder 48 is made of steel, and has the shape of a bottomed cylinder (cup) opening leftward. The discharge-side holder 48 is disposed on the left side of the coupling plate 46. The discharge-side holder 48 is fixed to the left end of the discharge-side rotary shaft 47.

The discharge-side gear 490 is made of steel, and has the shape of a circular plate. The discharge-side gear 490 is fixed to the outer peripheral surface of the discharge-side rotary shaft 47. The discharge-side gear 490 is disposed between the pair of bearing portions 44. The discharge-side pinion 491 is made of steel, and has the shape of a circular plate. The discharge-side pinion 491 is meshed with the discharge-side gear 490. A thickness T1 of the discharge-side gear 490 is larger than a thickness T2 of the discharge-side pinion 491. Therefore, the discharge-side pinion 491 and the discharge-side gear 490 can be meshed with each other even if the discharge-side gear 490 is displaced with respect to the discharge-side pinion 491 in the left-right direction. The discharge-side sprocket 492 is made of steel, and has the shape of a circular plate. The discharge-side sprocket 492 and the discharge-side pinion 491 are fixed to an identical shaft. As indicated by dash-dotted lines in FIG. 1, a chain 915 is wound between the discharge-side sprocket 492 and the discharge-side drive sprocket 913.

Figure 8:
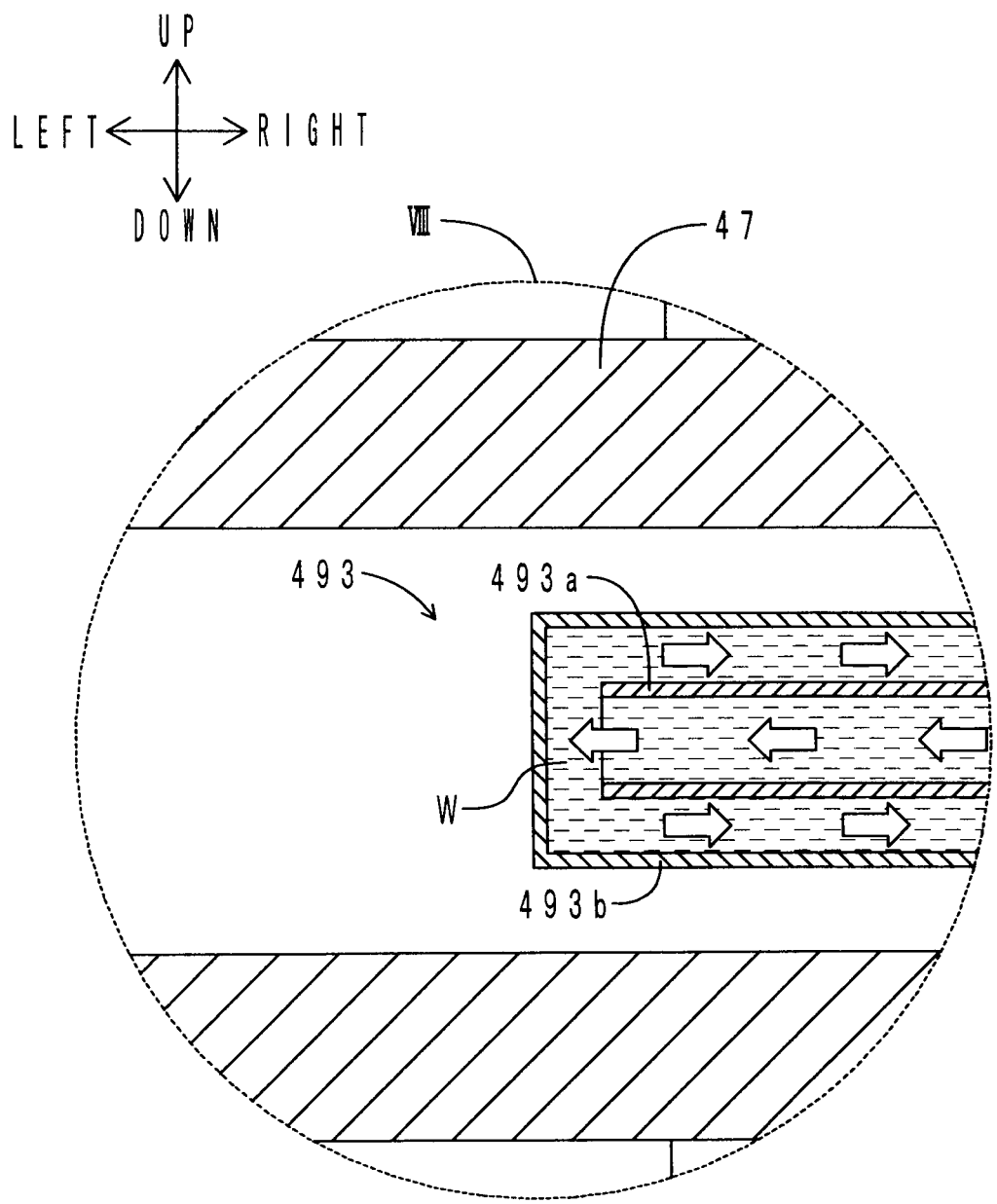
FIG. 8 is an enlarged view of a portion inside a circle VIII of FIG. 7.

FIG. 8 is an enlarged view of a portion inside a circle VIII of FIG. 7. The cooling pipe 493 is shown in cross section. As shown in FIG. 8, the cooling pipe 493 has the shape of a double cylinder, the left end of which is sealed. That is, the cooling pipe 493 includes an inner cylindrical portion 493a and an outer cylindrical portion 493b. Cooling water W is supplied from a water supply pipe 494 to the inner cylindrical portion 493a as indicated by an arrow Y5 in FIG. 7. The cooling water W flows leftward through a space radially inward of the inner cylindrical portion 493a, and turns backward at the left end of the cooling pipe 493. The cooling water W which has turned backward flows from the inner cylindrical portion 493a into the outer cylindrical portion 493b. The cooling water W having flowed into the outer cylindrical portion 493b flows rightward through a gap between the outer cylindrical portion 493b and the inner cylindrical portion 493a, and is discharged from a water discharge pipe 495 to the outside as indicated by an arrow Y6 in FIG. 7. The discharge-side rotary shaft 47, the pair of bearing portions 44, the discharge-side gear 490, the sealing portion 45, and so forth can be cooled by the cooling water W.

[Heating Section 8]

Figure 9:
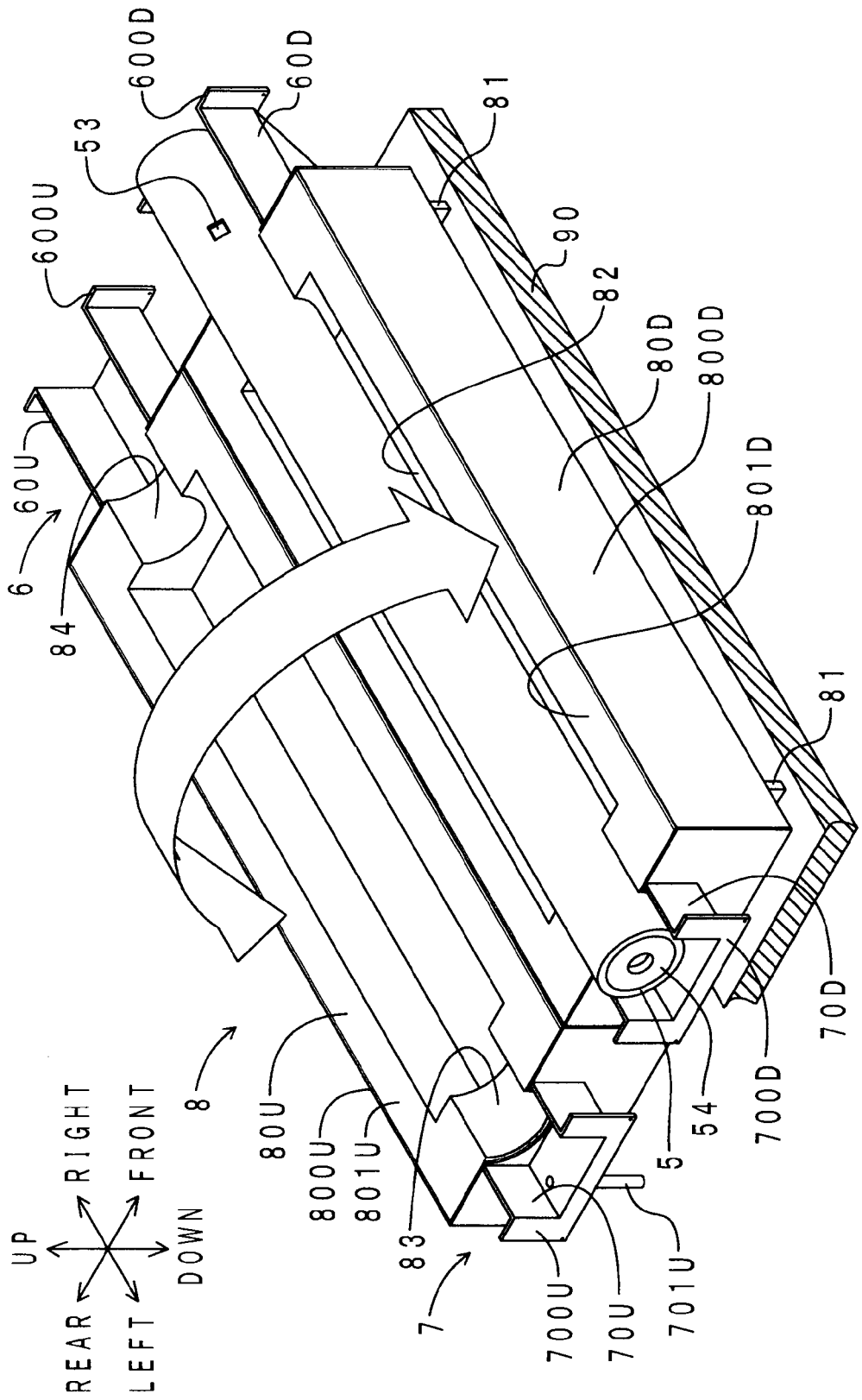
FIG. 9 is a perspective view of a center portion of the rotary kiln.

FIG. 9 is a perspective view of a center portion of the rotary kiln according to the embodiment. FIG. 9 shows an open state. As shown in FIG. 9, the heating section 8 includes a lower divided portion 80D and an upper divided portion 80U.

The lower divided portion 80D includes an outer shell 800D and a heat insulation material 801D. The outer shell 800D is made of steel, and has the shape of a rectangular box opening upward. The outer shell 800D is fixed to the upper surface of the platform 90 via a pair of support blocks 81. The heat insulation material 801D is made of a ceramic fiber or a heat insulation brick with a predetermined thickness, and is fixed to the inner surface of the outer shell 800D.

The upper divided portion 80U includes an outer shell 800U and a heat insulation material 801U. The configuration of the upper divided portion 80U is the same as the configuration of the lower divided portion 80D. The upper divided portion 80U and the lower divided portion 80D are coupled to each other via a hinge portion (not shown). The upper divided portion 80U can be opened and closed to the lower divided portion 80D. As shown in FIG. 9, in the open state, the upper divided portion 80U is disposed in rear of the lower divided portion 80D such that they are arranged side by side. Meanwhile, as shown in FIGS. 4 and 7, in a closed state, the upper divided portion 80U is disposed oppositely above the lower divided portion 80D. In the closed state, a heating chamber 82 is defined by the heat insulation materials 801D and 801U. A heater (not shown) is disposed in the heating chamber 82. Also, in the closed state, as shown in FIGS. 4 and 9, a supply-side shell insertion hole 83 is formed between an outer left portion of the heating section 8 and the heating chamber 82. In addition, as shown in FIGS. 7 and 9, a discharge-side shell insertion hole 84 is formed between an outer right portion of the heating section 8 and the heating chamber 82.

[Shell 5]

The shell 5 is made of carbon, and has the shape of a cylinder. The carbon is included in the carbon material according to the present invention. The shell 5 penetrates through the heating section 8 in the left-right direction. That is, the left end of the shell 5 projects from the supply-side shell insertion hole 83 to the outside. Also, the right end of the shell 5 projects from the discharge-side shell insertion hole 84 to the outside. The body portion of the shell 5 is housed in the heating chamber 82. The shell 5 is slightly inclined downward from the left to the right.

Figure 10:
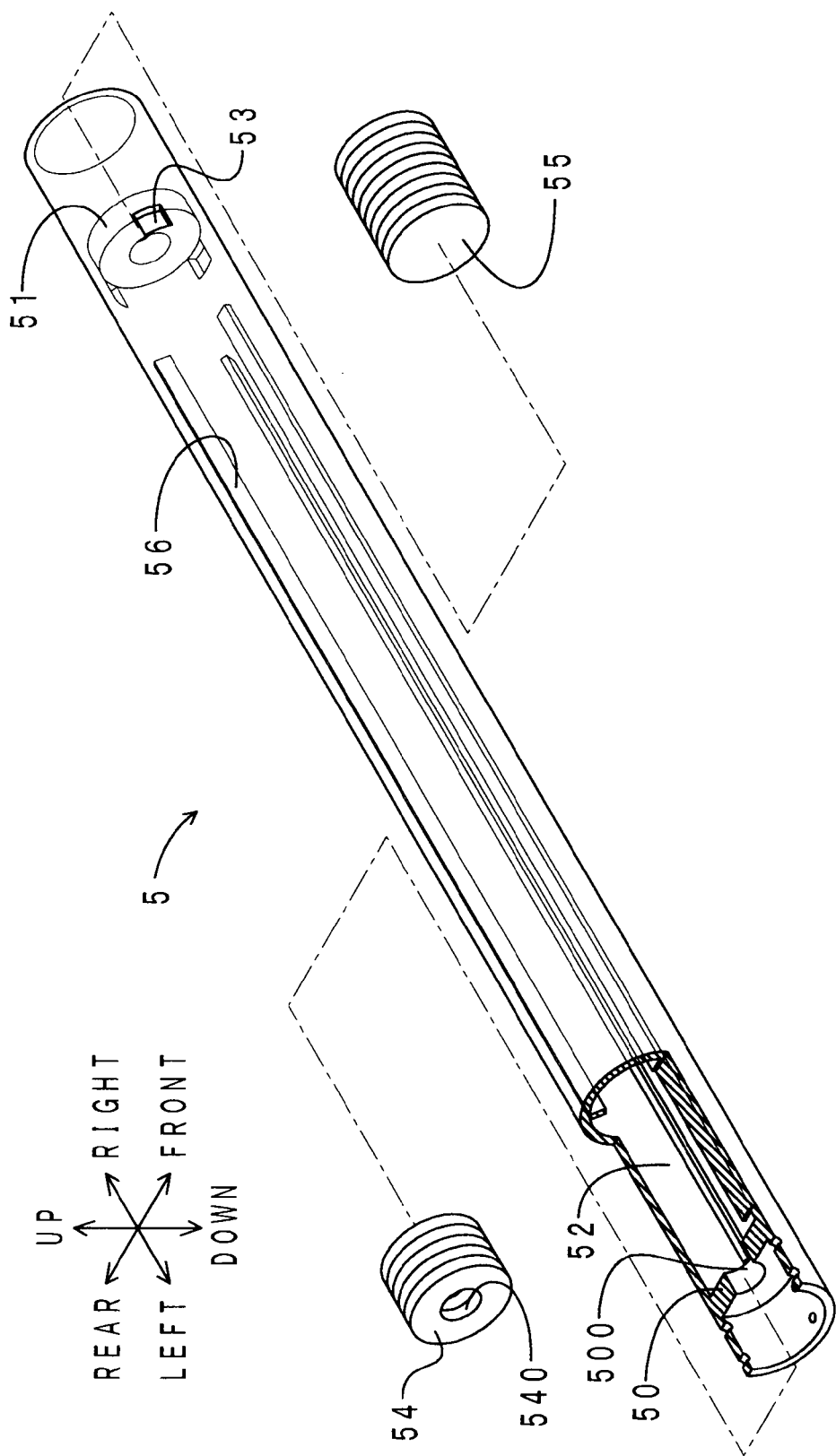
FIG. 10 is a transparent exploded perspective view of a shell of the rotary kiln.

FIG. 10 is a transparent exploded perspective view of the shell of the rotary kiln according to the embodiment. As shown in FIG. 10, the shell 5 includes a supply-side partition wall 50, a discharge-side partition wall 51, a heat treatment chamber 52, three discharge holes 53, five supply-side heat insulation plates 54, nine discharge-side heat insulation plates 55, and the three fins 56.

The supply-side partition wall 50 has the shape of a circular plate. The supply-side partition wall 50 is disposed in the vicinity of the left end of the shell 5. A supply-side rotary shaft insertion hole 500 is drilled in the supply-side partition wall 50. The discharge-side partition wall 51 has the shape of a circular plate. The discharge-side partition wall 51 is disposed in the vicinity of the right end of the shell 5.

The heat treatment chamber 52 is defined between the supply-side partition wall 50 and the discharge-side partition wall 51. As shown in FIGS. 4 and 7, the heat treatment chamber 52 is disposed radially inward of the heating chamber 82. Returning to FIG. 10, the discharge holes 53 are disposed on the left side of the discharge-side partition wall 51. The discharge holes 53 are in communication with the heat treatment chamber 52. The three discharge holes 53 are disposed at intervals of 120° in the circumferential direction of the shell 5.

The supply-side heat insulation plates 54 are made of a ceramic fiber or a ceramic board, and have the shape of a circular plate. A supply-side rotary shaft insertion hole 540 is drilled in each of the supply-side heat insulation plates 54. The five supply-side heat insulation plates 54 are disposed in a stacked state on the left side of the supply-side partition wall 50. The discharge-side heat insulation plates 55 are made of a ceramic fiber or a ceramic board, and have the shape of a circular plate. The nine discharge-side heat insulation plates 55 are disposed in a stacked state on the right side of the discharge-side partition wall 51.

The fins 56 have the shape of a rib. The fins 56 are disposed on the inner peripheral surface of the shell 5. The fins 56 are disposed between the supply-side partition wall 50 and the three discharge holes 53. The three fins 56 are disposed at intervals of 120° in the circumferential direction of the shell 5.

As shown in FIG. 4, the left end of the shell 5 is housed in the supply-side holder 38. The shell 5 and the supply-side holder 38 are bolted to each other. The supply-side rotary shaft 37 penetrates through the supply-side rotary shaft insertion holes 540 and 500 of the shell 5 from the left side. The opening at the penetrating end of the supply-side rotary shaft 37 is in communication with the heat treatment chamber 52.

As shown in FIG. 7, the right end of the shell 5 is housed in the discharge-side holder 48. The shell 5 and the discharge-side holder 48 are not fixed to each other. Therefore, the shell 5 is movable with respect to the discharge-side holder 48 in the left-right direction and in the circumferential direction.

[Supply-Side Coupling Tubular Portion 7]

As shown in FIG. 9, the supply-side coupling tubular portion 7 includes a lower divided portion 70D and an upper divided portion 70U. The lower divided portion 70D is made of steel, and has the shape of a semi-rectangular cylinder opening upward. The lower divided portion 70D is disposed at the left end of the lower divided portion 80D of the heating section 8. A flange divided portion 700D is disposed at the left end of the lower divided portion 70D.

The upper divided portion 70U is made of steel, and has the shape of a semi-rectangular cylinder opening upward in an open state. The upper divided portion 70U is disposed at the left end of the upper divided portion 80U of the heating section 8. A flange divided portion 700U is disposed at the left end of the upper divided portion 70U. A gas pipe 701U is projected from the bottom wall of the upper divided portion 70U in the open state. The gas pipe 701U is included in the gas supply section according to the present invention.

The upper divided portion 70U can be opened and closed to the lower divided portion 70D. As shown in FIG. 9, in the open state, the upper divided portion 70U is disposed in rear of the lower divided portion 70D such that they are arranged side by side. Meanwhile, as shown in FIG. 4, in a closed state, the upper divided portion 70U is disposed oppositely above the lower divided portion 70D. In the closed state, the flange divided portions 700D and 700U are joined together to form a supply-side holder insertion hole 71. The flange divided portions 700D and 700U are coupled to the coupling plate 36 of the supply-side support cart 3 via a bolt-nut mechanism. In the closed state, the left end of the shell 5 is housed inside the supply-side coupling tubular portion 7. A nitrogen gas is supplied from the gas pipe 701U into the supply-side coupling tubular portion 7 as indicated by an arrow Y7. The nitrogen gas is diffused inside the heating chamber 82 via the supply-side shell insertion hole 83.

[Discharge Chute 6]

As shown in FIG. 9, the discharge chute 6 includes a lower divided portion 60D and an upper divided portion 60U. The lower divided portion 60D is made of steel, and has the shape of a pyramid tapered downward. The lower divided portion 60D is disposed at the right end of the lower divided portion 80D of the heating section 8. A flange divided portion 600D is disposed at the right end of the lower divided portion 60D. As shown in FIG. 7, the lower end of the lower divided portion 60D is housed in the product extraction hole 902. A protection plate 601D made of carbon is disposed on the inner surface of the tapered portion of the lower divided portion 60D. The tapered portion of the lower divided portion 60D is included in the material contact portion according to the present invention.

Returning to FIG. 9, the upper divided portion 60U is made of steel, and has the shape of a semi-rectangular cylinder opening upward in an open state. The upper divided portion 60U is disposed at the right end of the upper divided portion 80U of the heating section 8. A flange divided portion 600U is disposed at the right end of the upper divided portion 60U.

The upper divided portion 60U can be opened and closed to the lower divided portion 60D. As shown in FIG. 9, in the open state, the upper divided portion 60U is disposed in rear of the lower divided portion 60D such that they are arranged side by side. Meanwhile, as shown in FIG. 7, in a closed state, the upper divided portion 60U is disposed oppositely above the lower divided portion 60D. In the closed state, the flange divided portions 600D and 600U are joined together to form a discharge-side holder insertion hole 61. The flange divided portions 600D and 600U are coupled to the coupling plate 46 of the discharge-side support cart 4 via a bolt-nut mechanism. In the closed state, the right end of the shell 5 is housed inside the discharge chute 6.

<Motion During Manufacture of Battery Material>

Next, the motion of the rotary kiln according to the embodiment during manufacture of a battery material will be described. First, as shown in FIG. 1, the motor 910 is driven. The drive force of the motor 910 is transmitted to the supply-side gear 390 via the shaft 911, the supply-side drive sprocket 912, the chain 914, the supply-side sprocket 392, and the supply-side pinion 391 in this order. In addition, the drive force of the motor 910 is transmitted to the discharge-side gear 490 via the shaft 911, the discharge-side drive sprocket 913, the chain 915, the discharge-side sprocket 492, and the discharge-side pinion 491 in this order. As shown in FIG. 2, the supply-side gear 390 is fixed to the supply-side rotary shaft 37. The supply-side holder 38 is fixed to the supply-side rotary shaft 37. The left end of the shell 5 is housed in the supply-side holder 38. Therefore, rotation of the supply-side gear 390 causes the shell 5 to rotate. Also, as shown in FIG. 2, the discharge-side gear 490 is fixed to the discharge-side rotary shaft 47. The discharge-side holder 48 is fixed to the discharge-side rotary shaft 47. Therefore, rotation of the discharge-side gear 490 causes the discharge-side holder 48 to rotate. In this way, the supply-side gear 390 causes the shell 5 to rotate about its own axis, and the discharge-side gear 490 causes the discharge-side holder 48 to rotate about its own axis.

Then, as shown in FIG. 4, the screw feeder 27 is driven. Then, the process material A is transferred from the supply hopper 29 to the heat treatment chamber 52. Subsequently, as shown in FIG. 10, the process material A is moved rightward with the three fins 56 stirring the process material A inside the rotating shell 5. The heat treatment chamber 52 is heated in a predetermined temperature pattern by the heating chamber 82. Therefore, a predetermined heat treatment can be performed on the process material A by causing the process material A to pass through the heat treatment chamber 52.

After that, as shown in FIG. 7, a battery material B which is obtained after the heat treatment is ejected from the discharge holes 53 of the rotating shell 5. The ejected battery material B slides down inside the discharge chute 6 while colliding against the protection plate 601D. The battery material B which has slid down is stored in a product housing portion (not shown) disposed below the discharge chute 6. In this way, the battery material B is manufactured by performing a heat treatment on the process material A.

During manufacture of the battery material B, as shown in FIG. 4, a nitrogen gas is supplied from the sealing portion 28 (arrow Y1) to a space radially inward of the shell 5. Also, a nitrogen gas is supplied from the sealing portion 35 (arrow Y2) to a space radially outward of the shell 5. Also, a nitrogen gas is supplied from the gas pipe 701U (arrow Y7) to a space radially outward of the shell 5. Moreover, as shown in FIG. 7, a nitrogen gas is supplied from the sealing portion 45 (arrow Y4) to a space radially outward of the shell 5. Thus, a nitrogen gas is supplied to a space radially inward of the shell 5 and a space radially outward of the shell 5 during manufacture of the battery material B. Moreover, as shown in FIG. 8, the discharge-side rotary shaft 47 is cooled by the cooling pipe 493 during manufacture of the battery material B.

<Motion During Replacement of Shell>

Figure 11:
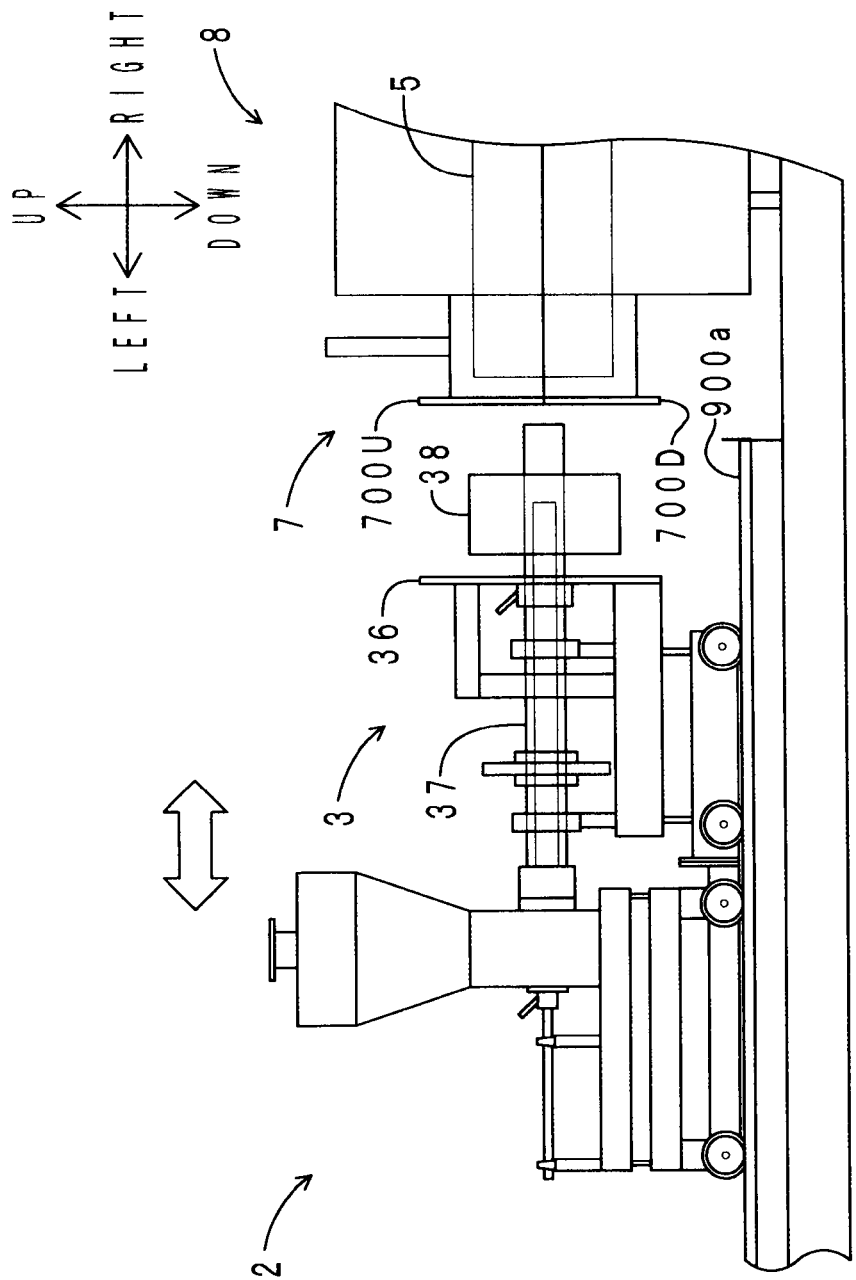
FIG. 11 is a transparent front view of the left portion of the rotary kiln during replacement of the shell.
Figure 12:
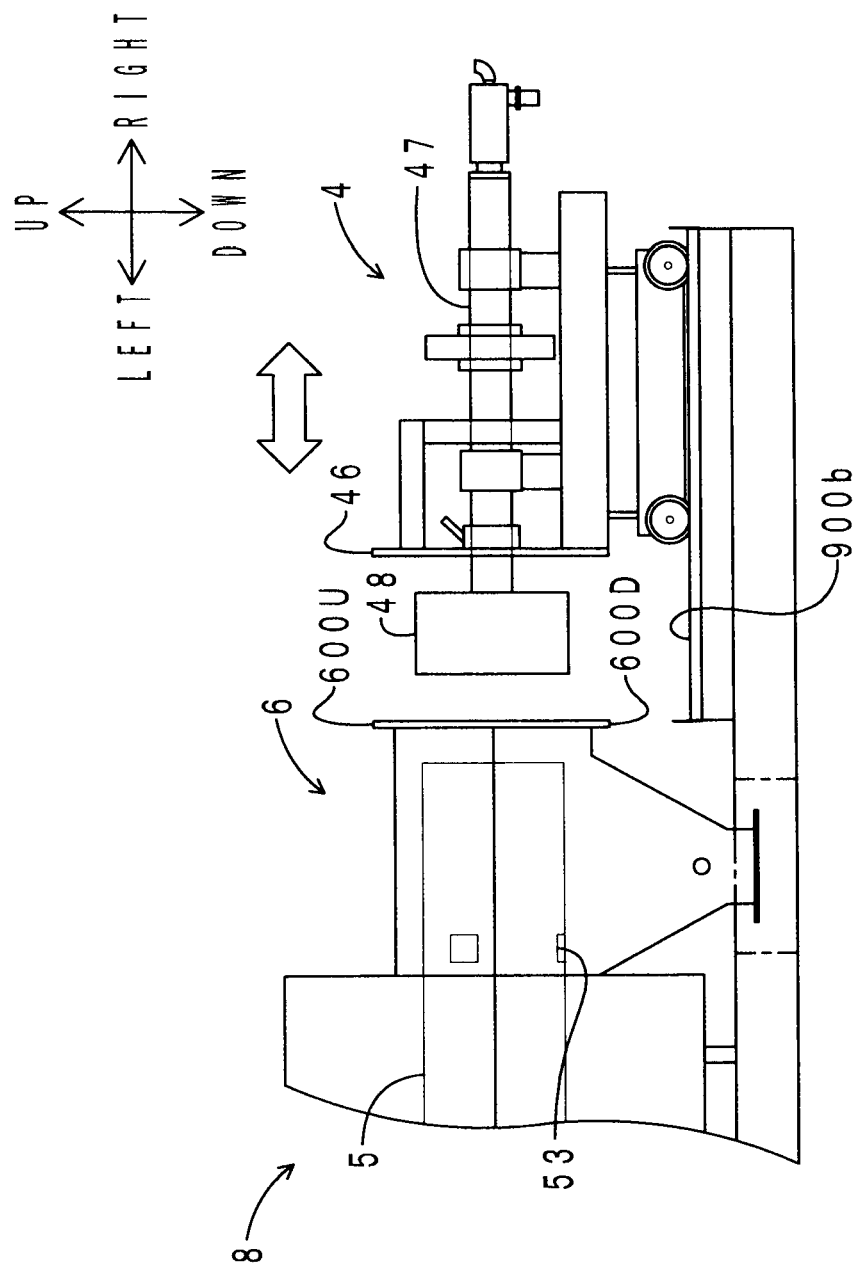
FIG. 12 is a transparent front view of the right portion of the rotary kiln during replacement of the shell.

Next, the motion of the rotary kiln according to the embodiment during replacement of the shell will be described. FIG. 11 is a transparent front view of the left portion of the rotary kiln according to the embodiment during replacement of the shell. FIG. 12 is a transparent front view of the right portion of the rotary kiln according to the embodiment during replacement of the shell.

First, as shown in FIG. 4, the nuts are removed from the bolts to decouple the coupling plate 36 of the supply-side support cart 3 and the flange divided portions 700U and 700D. Also, as shown in FIG. 7, the nuts are removed from the bolts to decouple the coupling plate 46 of the discharge-side support cart 4 and the flange divided portions 600U and 600D. Moreover, as shown in FIG. 11, the bolts are removed to decouple the left end of the shell 5 and the supply-side holder 38.

Then, the supply part cart 2 and the supply-side support cart 3 are moved leftward along the pair of rails 900a. Then, the supply-side rotary shaft 37 and the supply-side holder 38 are taken out of the supply-side coupling tubular portion 7. In addition, the discharge-side support cart 4 is moved rightward along the pair of rails 901a. Then, the discharge-side rotary shaft 47 and the discharge-side holder 48 are taken out of the discharge chute 6.

Subsequently, as shown in FIG. 9, the supply-side coupling tubular portion 7, the heating section 8, and the discharge chute 6 are brought from the closed state into the open state. Bringing the supply-side coupling tubular portion 7, the heating section 8, and the discharge chute 6 into the open state exposes the shell 5. After that, the shell 5 is removed by a jack, a winch, a crane, or the like.

Thereafter, a new shell 5 is mounted on the heating section 8, the supply-side coupling tubular portion 7, the heating section 8, and the discharge chute 6 are brought from the open state into the closed state, and the supply part cart 2, the supply-side support cart 3, and the discharge-side support cart 4 are brought back in position. Then, the bolts and the nuts are tightened. The shell 5 is thus replaced.

<Motion during Replacement of Screw Feeder>

Figure 13:
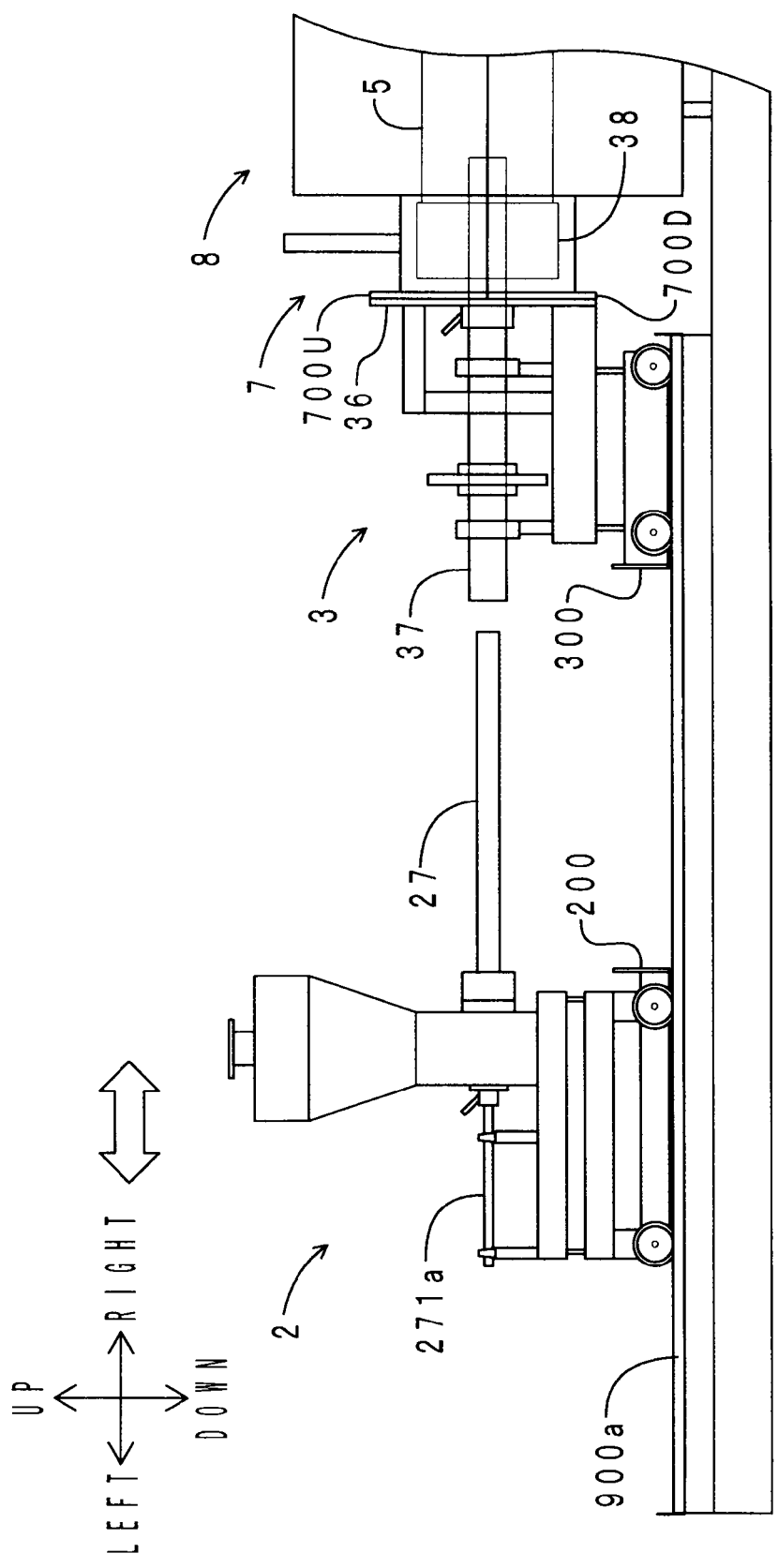
FIG. 13 is a transparent front view of the left portion of the rotary kiln during replacement of a screw feeder.

Next, the motion of the rotary kiln according to the embodiment during replacement of the screw feeder will be described. FIG. 13 is a transparent front view of the left portion of the rotary kiln according to the embodiment during replacement of the screw feeder.

First, as shown in FIG. 4, the nut is removed from the bolt to decouple the coupling plate 200 of the supply part cart 2 and the coupling plate 300 of the supply-side support cart 3. Then, the supply part cart 2 is moved leftward along the pair of rails 900a. Then, the screw feeder 27 is taken out of the supply-side rotary shaft 37. Subsequently, the screw feeder 27 is removed. Thereafter, a new screw feeder 27 is mounted on the supply part cart 2, and the supply part cart 2 is brought back in position. Then, the bolts and the nuts are tightened. The screw feeder 27 is thus replaced.

<Function and Effect>

Next, the function and effect of the rotary kiln and the battery material manufactured by the rotary kiln according to the embodiment will be described. The shell 5 of the rotary kiln 1 according to the embodiment is made of carbon. Therefore, contamination of metal scale, which adversely affects the battery material B, into the battery material B can be suppressed. Thus, degradation in performance of the battery material B can be suppressed. Also, the shell 5 made of carbon provides excellent processability. Therefore, as shown in FIG. 10, members such as the supply-side partition wall 50, the discharge-side partition wall 51, the discharge holes 53, and the fins 56 can be easily provided in the shell 5. These members can be provided in the shell 5 by cutting a carbon block or by bolting. Moreover, the shell 5 made of carbon provides excellent heat shock resistance.

Also, the heat treatment chamber 52 is disposed radially inward of the shell 5. Therefore, a heat treatment involves a rise in temperature of the shell 5. A rise in temperature of the shell 5 may cause oxidation of the shell 5 made of carbon.

In this respect, according to the rotary kiln 1 of the embodiment, a nitrogen gas is supplied from each of the sealing portion 28 of FIG. 4 (arrow Y1), the sealing portion 35 of FIG. 5 (arrow Y2), the gas pipe 701U of FIG. 4 (arrow Y7), and the sealing portion 45 of FIG. 7 (arrow Y4). Therefore, oxidation of the inner peripheral surface and the outer peripheral surface of the shell 5 can be suppressed.

According to the rotary kiln 1 of the embodiment, as shown in FIG. 7, the protection plate 601D made of carbon is disposed in the discharge chute 6. Therefore, contamination of metal scale into the battery material B from the lower divided portion 60D made of steel can be suppressed.

The rotary kiln 1 of the embodiment can adapt to increases and decreases in overall length of the shell 5 in the axial direction (left-right direction) due to heat of the heating section 8 or the like. That is, as shown in FIG. 5 illustrating the sealing portion 35, a slide margin in the axial direction is secured between the inner annular portion 350 and the outer annular portion 351 of the sealing portion 45. Also, as shown in FIG. 7, the pair of bearing portions 44 is each a dry metal bearing that supports the discharge-side rotary shaft 47 so as to be slidable in the axial direction. Moreover, as shown in FIG. 6, the thickness T1 of the discharge-side gear 490 is set to be larger than the thickness T2 of the discharge-side pinion 491. Therefore, the discharge-side pinion 491 and the discharge-side gear 490 can be meshed with each other even if the discharge-side gear 490 is displaced with respect to the discharge-side pinion 491 in the left-right direction. The rotary kiln 1 according to the embodiment can thus adapt to increases and decreases in overall length of the shell 5 in the axial direction.

According to the rotary kiln 1 of the embodiment, as shown in FIG. 1, the supply-side gear 390 and the discharge-side gear 490 are driven by the single motor 910. Therefore, the rotational speed of the supply-side rotary shaft 390 and the rotational speed of the discharge-side rotary shaft 490 can be easily matched with each other. Thus, the discharge-side holder 48 and the shell 5 are not likely to slide relative to each other. In other words, the shell 5 is not easily worn out.

According to the rotary kiln 1 of the embodiment, as shown in FIG. 4, the supply-side holder 38 is bolted to the shell 5. Meanwhile, as shown in FIG. 7, the discharge-side holder 48 is not fixed to the shell 5. Therefore, a torsional force is not likely to be applied to the shell 5 even in the case where the rotational speed of the supply-side gear 390 and the rotational speed of the discharge-side gear 490 are different from each other.

According to the rotary kiln 1 of the embodiment, not the shell 5 but the supply-side rotary shaft 37 and the discharge-side rotary shaft 47 are driven to rotate. This eliminates the need to dispose a gear directly on the shell 5. Thus, the shell 5 can be processed easily. Moreover, the shell 5 with any diameter can be mounted by changing the diameter of the supply-side holder 38 and the diameter of the discharge-side holder 48 in accordance with the diameter of the shell 5. This provides high versatility for the diameter of the shell 5.

According to the rotary kiln 1 of the embodiment, the shell 5 can be inspected and replaced easily. That is, the shell 5 can be inspected and replaced easily just by moving the supply part cart 2 and the supply-side support cart 3 as shown in FIG. 11, moving the discharge-side support cart 4 as shown in FIG. 12, and switching the supply-side coupling tubular portion 7, the heating section 8, and the discharge chute 6 from the closed state to the open state as shown in FIG. 9.

According to the rotary kiln 1 of the embodiment, the screw feeder 27 can be inspected and replaced easily. That is, the screw feeder 27 can be inspected and replaced easily just by moving the supply part cart 2 as shown in FIG. 13.

In the case where the shell 5 has a double cylinder construction with an outer layer made of a metal and an inner layer made of carbon, the inner layer is generally bolted to the outer layer. With such a construction, a minute gap, that is, an air layer, is likely to be interposed between the inner layer and the outer layer. Therefore, heat is not easily conducted from the outer layer to the inner layer. In contrast, the shell 5 of the rotary kiln 1 according to the embodiment is a one-piece member made of carbon. Therefore, heat is easily conducted from the outer surface to the inner surface. Thus, the shell 5 provides excellent thermal conductivity.

<Other Embodiments>

The rotary kiln and the battery material manufactured by the rotary kiln according to the embodiment of the present invention have been described above. However, the present invention should not be specifically limited to the embodiment described above. The present invention can also be implemented in various modified or improved forms that may occur to those skilled in the art.

For example, the type of the rotary kiln 1 is not specifically limited. The present invention may be applied to a rotary kiln in which a supply-side member or a discharge-side member is immovable. The type of the non-oxidizing gas is also not specifically limited. An inert gas (such as helium and argon) or a reducing gas (such as a carbon monoxide gas) may be used. The shell 5 may be fabricated by performing a cutting process on a carbon block. Alternatively, the shell 5 may be fabricated by winding a carbon fabric. Still alternatively, the shell 5 may be fabricated by a molding process such as extrusion molding and CIP (Cold Isostatic Press) molding.

As the process material A, $LiFePO_4$ and carbon powder, which are respectively a cathode material and a anode material for an ferric phosphate lithium-ion battery, may be used, for example. In this case, contamination of carbon of the shell 5 into the cathode material has little effect on the cathode material compared to a case of contamination of metal scale into the cathode material. Also, contamination of carbon of the shell 5 into the anode material has little effect on the anode material because the anode material itself is made of carbon.

What is claimed is:

1. A rotary kiln comprising:
a cylindrical shell made of carbon and that rotates about an axis thereof,
a heat treatment chamber provided radially inward of the shell, and
a gas supply section that supplies a non-oxidizing gas to a space radially inward of the shell and a space radially outward of the shell,
wherein a heat treatment is performed on a process material in the heat treatment chamber to manufacture a battery material.

2. The rotary kiln according to claim 1, further comprising:
a discharge section that discharges the battery material from the shell,
wherein a material contact portion of the discharge section that contacts the battery material is made of carbon.

3. The rotary kiln according to claim 1, wherein the shell is a one-piece member made of carbon.

4. The rotary kiln according to claim 1, wherein the non-oxidizing gas is at least one selected from the group consisting of helium, argon, and carbon monoxide.

* * * * *